United States Patent
Nath et al.

(10) Patent No.: US 8,185,355 B2
(45) Date of Patent: May 22, 2012

(54) SLOT-CACHE FOR CACHING AGGREGATES OF DATA WITH DIFFERENT EXPIRY TIMES

(75) Inventors: Suman K. Nath, Redmond, WA (US); Yanif Ahmad, Providence, RI (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 11/696,027

(22) Filed: Apr. 3, 2007

(65) Prior Publication Data

US 2008/0247313 A1    Oct. 9, 2008

(51) Int. Cl.
*G04F 1/00* (2006.01)
*G06F 19/00* (2011.01)
*G06F 13/00* (2006.01)

(52) U.S. Cl. ........ 702/188; 702/176; 711/117; 711/118; 711/133

(58) Field of Classification Search .................. 702/188, 702/176; 711/118, 117, 133
See application file for complete search history.

(56) References Cited

U.S. PATENT DOCUMENTS

| | | | |
|---|---|---|---|
| 6,084,595 A | 7/2000 | Bach et al. | |
| 6,094,694 A | 7/2000 | Hickson et al. | |
| 6,154,811 A | 11/2000 | Srbljic et al. | |
| 6,157,930 A | 12/2000 | Ballard et al. | |
| 6,651,140 B1 | 11/2003 | Kumar | |
| 6,694,311 B1 | 2/2004 | Smith | |
| 6,732,088 B1 | 5/2004 | Glance | |
| 6,981,105 B2 | 12/2005 | Bourne et al. | |
| 7,065,558 B2 | 6/2006 | Ramanathan et al. | |
| 7,080,065 B1 | 7/2006 | Kothuri et al. | |
| 2004/0193615 A1 | 9/2004 | Kothuri | |
| 2005/0015216 A1 | 1/2005 | Kothuri | |
| 2005/0165749 A1 | 7/2005 | Mazzagatti et al. | |
| 2006/0095676 A1 | 5/2006 | Dzierzon et al. | |
| 2006/0161645 A1 | 7/2006 | Moriwaki et al. | |
| 2006/0224700 A1 | 10/2006 | Chory et al. | |
| 2006/0256210 A1 | 11/2006 | Ryall et al. | |
| 2008/0104530 A1* | 5/2008 | Santanche et al. | 715/764 |
| 2008/0195584 A1* | 8/2008 | Nath et al. | 707/3 |

FOREIGN PATENT DOCUMENTS

EP    GB2329986 A    4/1999

OTHER PUBLICATIONS

Deshpande, Amol et al., "Cache-and-Query for Wide Area Sensor Databases"; SIGMOD; San Diego, CA; 2003; pp. 1-12.*

(Continued)

*Primary Examiner* — Janet Suglo
(74) *Attorney, Agent, or Firm* — Lee & Hayes, PLLC

(57) ABSTRACT

Techniques for collecting and displaying sensor data captured by a spatially and temporally representative sample of sensors requested in a search query are described. The sensors are represented in an index structure (e.g., a data tree) having a plurality of leaf nodes and internal nodes. The leaf nodes are associated with sensors and the internal nodes are allotted with caches having cache slots for storing sensor data with various expiry times. In response to a query, the index structure is leveraged to identify a set of nodes associated with sensors of a user selected spatial region. Sensor data having an expiry time greater than a user specified expiry time is then collected from one or more cache slots of the set of nodes. In this manner, the number of sensors to be probed to collect the sensor data is reduced.

18 Claims, 12 Drawing Sheets

OTHER PUBLICATIONS

Gopalan, et al., "Caching with Expiration Times", available at least as early as Feb. 14, 2007, at <<http://www-static.cc.gatech.edu/~mihail/www-papers/soda02.pdf>>, pp. 540-547.

Nath, at al., "Challenges in Building a Portal for Sensors World-Wide", available at least as early as Feb. 14, 2007, at <<http://research.microsoft.com/nec/publications/SensorMap_WSW2006.pdf>>, ACM, 2006, pp. 1-5.

Yuen, et al., "Cache Invalidation Scheme for Mobile Computing Systems with Real-time Data", available at least as early as Feb. 14, 2007, at <<http://acm.org/sigmod/record/issues/0012/yuen.pdf>>, pp. 1-7.

Ganesan, et al., "Dimensions: Why do we need a new Data Handling Architecture for Sensor Networks?", retrieved at <<http//delivery.acm.org/10.1145T780000/774786/p143-ganesan.pdf?key1=774786& key2=6919524611&coll=Guide&d1=Guide&CFID=75919783& Cftoken=92791909>>, ACM SIGCOMM Computer Communications Review, vol. 33, No. 1, Jan. 2003, pp. 143-148.

Ganesan, et al., "Multiresolution Storage and Search in Sensor Networks", retrieved at <<http://delivery.acm.org/10.1145/1090000/1084780/p277-ganesan.pdf? key1=1084780&key2=6078524611&coll=ACM&CFID=75919783&CFToken=92791909>>, ACM Transactions on Storage, vol. 1, No. 3, Aug. 2005, ACM, 2005, pp. 277-315.

Greenstein, et al., "DIFS: A Distributed Index for Features in Sensor Networks", retrieved on Nov. 28, 2006 at http://scholar.google.com/scholar?hl=en&lr=&q=cache:ylBjfUKYcwUJ:dimlab.usc.edu/csci599/Fall2003/Sensor%2520Network/DIFS%2520A%2520Distributed%02520Index%2520for%2520Features%2520in%2520Sensor.pdf>>, Proc First IEEE Intl Workshop on Sensor Network Protcolos and Applications, May 2003, pp. 1.

Guttman, "R-Trees: A Dynamic Index Structure for Spatial Searching", retrieved at <<http://www.sai.msu.su/-megera/postgres/gist/papers/gutman-rtree.pdf>>, Proc 1984 ACM SIGMOD Intl Conf on Management of Data, Jun. 1984, pp. 47-57.

Li, et al., "Multi-dimensional Range Queries in Sensor Networks", retrieved at <<http://citeseer.ist.psu.edu/cache/papers/cs2/179/http:zSzzSzenl.usc.eduzSzpaperszSz.zSzcachezSzp046-Ii.pdf/multi-dimensional-range-queries.pdf>>, SenSys'03, Nov. 5-7, 2003, ACM, 2003, 13 pgs.

\* cited by examiner

SLOT-CACHE FOR CACHING AGGREGATES OF DATA WITH DIFFERENT EXPIRY TIMES

This application is related to concurrently filed U.S. patent application Ser. No. 11/673,448, filed Feb. 2, 2007, which is incorporated herein by reference.

BACKGROUND

Over the past several years, there has been a proliferation of sensor network deployments into our environments. Sensors in such networks capture data pertaining to weather, traffic, parking, security, real-time views, and many other data items and conditions.

The sensor data portal model has been designed to expose the data for search and querying by a general audience. Sensor data web portals enable browsing of disparate collections of sensor networks. Such portals function as a rendezvous point for sensor network administrators to publish their data, and through which a large base of users may pose individual queries to the sensor network. Thus, the sensor data web portal provides a platform with which users can interact and visualize content being generated by autonomous sensor networks.

However, sensor data web portals commonly experience time delays due to the continuously changing nature of sensor readings and unavailability of data. Therefore, there remains a need to improve the way sensor data is collected and presented to users via a web portal.

SUMMARY

This summary is provided to introduce simplified concepts relating to spatial and temporal searches, and these concepts are further described below in the detailed description. This summary is not intended to identify essential features of the claimed subject matter, nor is it intended for use in determining the scope of the claimed subject matter.

Techniques for collecting and displaying sensor data captured by a spatially and temporally representative sample of sensors requested in a search query are described. The sensors are represented in an index structure (e.g., a data tree). The index structure includes a plurality of leaf nodes and internal nodes. The leaf nodes are nodes directly associated with sensors and do not have any nodes dependent therefrom. The internal nodes have one or more leaf nodes and/or internal nodes dependent therefrom. The internal nodes are allotted with caches having cache slots for storing sensor data with various expiry times.

The search query includes a selected spatial region from which the sensor data can be collected and an expiry time of the sensor data. In response to the search query, the index structure is leveraged to identify a set of nodes associated with sensors corresponding to the user selected spatial region. Sensor data having an expiry time greater than a user specified expiry time is then collected from one or more cache slots of the set of nodes. In this manner, the number of sensors to be probed to collect the sensor data is reduced, thereby reducing latency involved with polling a large number of sensors and making the search process more efficient.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

Figure 1:
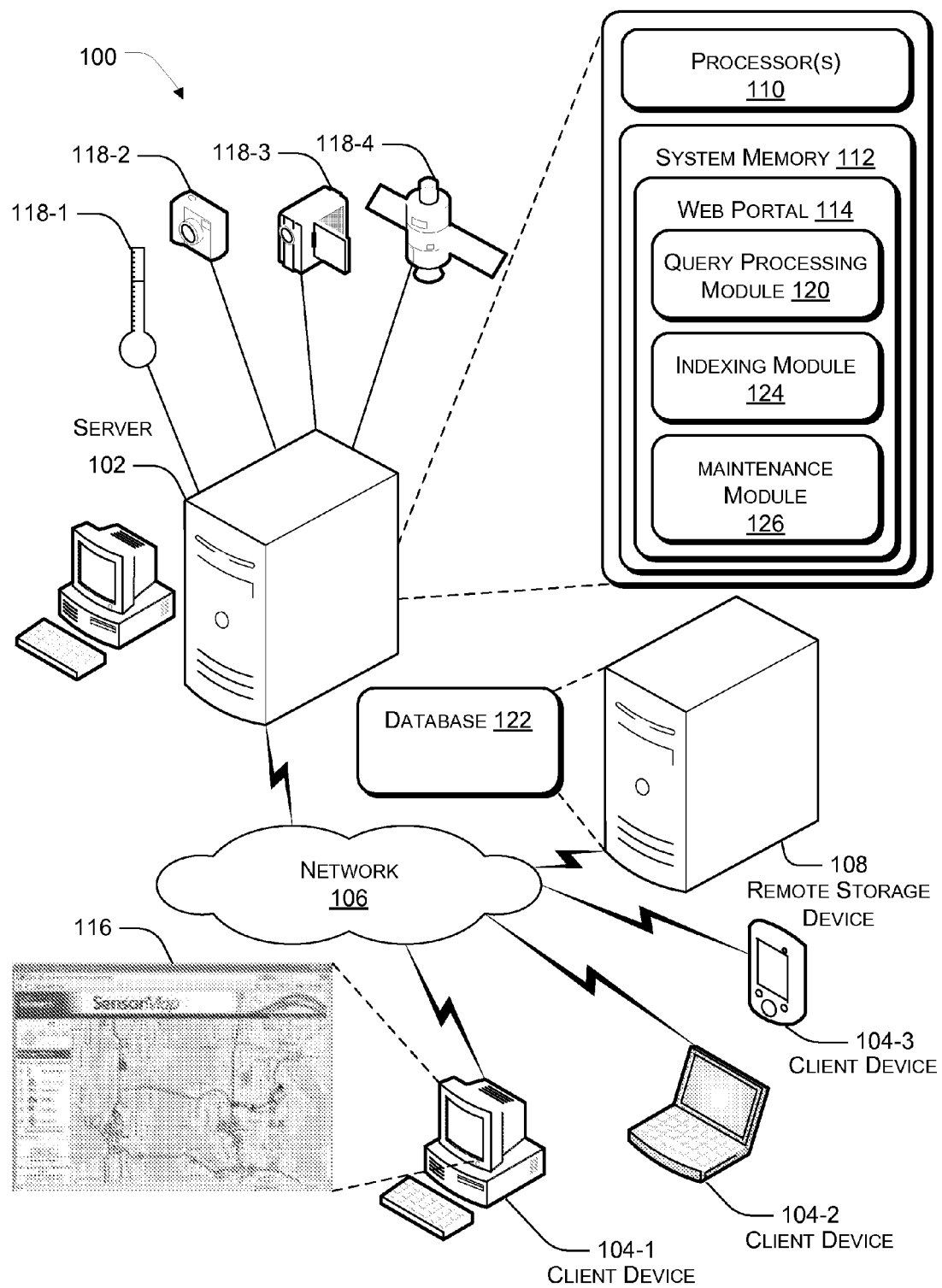
FIG. 1 illustrates an exemplary architecture in which one or more client devices can access a server over a network to conduct a spatial search and a temporal search for sensor data using a web portal.

This disclosure is directed to techniques for conducting a spatial and temporal search for sensor data using a sensor data web portal. The portal provides users with continuous access to sensor readings obtained from various sensors spread throughout disparate sensor networks. Users specify certain spatial regions from which they wish to receive sensor readings, and a summarization of the sensor readings satisfying these conditions is produced and returned, rather than values from individual sensors. In one implementation, a user query can include specified expiry times for the sensor readings. The summarization may be performed in many ways, including by simple aggregates such as an average value over groups of sensors in the query region having data that expires after the specified expiry time, a maximum value, a minimum value, or sum of the values.

Generally, query processing in the sensor portal involves two high-level components: (1) a portal web service to facilitate query processing and (2) a backend database to maintain sensor metadata and provide core search functionality. In this architecture, data is not maintained in any persistent archive, but is instead collected in an on-demand fashion during query processing. First, a portal service translates any queries issued by clients into a sequence of declarative queries. The first query asks the backend database to determine a set of relevant sensors. The database processes the queries by inspecting the sensor locations it maintains. Upon receipt of a list of sensors, the database first checks cache slots to ascertain whether there is any recent and current sensor data that can be returned to satisfy the query. The recent and current data include sensor data having an expiry time greater than a user defined expiry time. If fresh data in the cache slots is not sufficient to answer the query, the web service polls the sensors for updated readings and issues a second query to the database to insert new readings into the cache slots maintained in the backend. The web service then queries the database for all relevant readings from the cache slots and presents the results to the user. Moreover, the backend database may routinely poll sensors as data in the cache slots become stale. This polling may occur responsive to a search query or as part of a separate process. The polling is thus conducted in a manner transparent to the user, as the user merely submits a query and receives results from the web portal.

One challenge for the data portal is to provide effective caching of the sensor data and timely processing of user queries using a data collection mechanism that efficiently caches and retrieves readings from the sensor networks, with large numbers of sensors and large volumes of queries present in the system. The techniques described herein address this challenge by facilitating caching of the sensor data at each layer of the index structure. The sensor data is stored in different cache slots depending at least in part upon an expiry time associated with the sensor data. The sensor data in a cache slot at a layer can be obtained by aggregating the sensor data in one or more corresponding cache slots dependent therefrom. The caching and aggregation of sensor data leverages the index structure to optimize the frequency of collection of sensor readings from the sensor networks and the usage of cached sensor data. Thus, the number of sensors to be probed for collecting sensor readings and the latency involved with polling a large number of sensors is reduced, thereby making the process more efficient.

The techniques described herein may be used in many different operating environments and systems. Multiple and varied implementations are described below. An exemplary environment that is suitable for practicing various implementations is discussed in the following section.

Exemplary systems and methodologies for obtaining the sensor data from various sensors through the sensor data web portal are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing contexts, acts and operations described hereinafter is implemented in hardware or other forms of computing platforms.

Exemplary Environment

FIG. 1 illustrates an exemplary architecture 100 in which a communication efficient spatial and temporal search sensor data web portal may be implemented. The architecture 100 is shown in a client-server environment where a server 102 receives queries from any number of client devices 104-1, 104-2, and 104-3 (collectively referred to as devices 104) over a network 106. The queries contain requests for sensor data from sensors in distributed sensor networks. The server 102 processes the queries by employing a sensor index maintained locally or on a remote storage device 108 that is accessible over the network 106. After processing, the server 102 returns results to the client devices 104.

The server 102 may be implemented in many ways including, for example, as a stand alone general purpose computing device or mainframe, or as a cluster of servers (e.g., arranged in a server farm). The client devices 104 may be implemented in any number of ways including, for example, as general purpose computing devices, laptops, mobile computing devices, PDAs, communication devices, GPS-equipped devices, and/or so on. The network 106 may include, but is not limited to, a Local Area Network (LAN), a Wide Area Network (WAN), and a Metropolitan Area Network (MAN). Further, the network 106 is representative of a wireless network, a wired network, or a combination thereof. The remote storage device 108 may be implemented in any number of ways, including as a remote database server or as an accessible networked storage device, such as a RAID system or the like.

The server 102 includes one or more processor(s) 110 coupled to a system memory 112. The processor(s) 110 may include, for example, microprocessors, microcomputers, microcontrollers, multi-core processors, and so forth. The processor(s) 110 are configured to fetch and execute computer-program instructions stored in the system memory 112. The system memory 112 includes computer-readable media in the form of volatile memory, such as Random Access Memory (RAM) and/or non-volatile memory, such as Read Only Memory (ROM) or flash RAM.

The server 102 hosts a web portal 114 that facilitates user access to sensor data obtained from the various sensors. The web portal 114 provides a user interface (UI) that may be rendered on the client devices 104 to support submission of user queries for the sensor data and presentation of results. One example UI 116 is illustrated as a browser-rendered graphical UI titled "SensorMap" on the client device 104-1. The UI 116 allows users to specify spatial regions and a particular expiry time to identify a collection of sensors from which they wish to receive readings expiring after the particular expiry time. The sensors may be of any type including, for example, temperature sensors, video cameras, humidity sensors, wind sensors, traffic sensors, parking sensors, security sensors, and so on. In FIG. 1, representative sensors include a temperature sensor 118-1, a camera 118-2, a video camera 118-3, and any other sensors 118-4 (collectively referred to as sensors 118).

Upon receiving a query submitted by the client device 104, the server 102 analyzes and translates the query into a sequence of declarative queries that may be used to identify a set of sensors that can contribute to the sensor data requested by the user. The server 102 implements a query processing module 120, which is stored in the system memory 112 and executed by the processor(s) 110. To aid in identifying the appropriate set of sensors to respond to the user's query, the query processing module 120 discovers attributes of the set of sensors. The attributes may include, for example, sensor location in terms of latitude and longitude, type of sensor, schemas for sensor readings, expiry times of sensor readings, and so on.

In one implementation, information regarding the expiry time of sensor data collected by the sensors may be stored in a database 122, which is illustrated as being stored in the remote storage device 108 (although it may be stored in other locations, such as within the system memory 112). In such an implementation, the query processing module 120 may compare the specified expiry time of the sensor data required by the user with the information in the database 122 to identify the set of sensors.

In another implementation, the query processing module 120 ascertains various sensor attributes from the database 122. The database 122 stores an index of the sensors, and the index maintains metadata describing the attributes of the sensors and cached sensor readings. The server 102 has an indexing module 124 stored in the system memory 112 and executable on the processor(s) 110 to create such index structures. In one implementation, the index is structured as a data tree having plural nodes arranged in layers. The plural nodes include leaf nodes coupled with the sensors to collect and store sensor readings and their respective expiry times. The plural nodes also include non-leaf nodes or internal nodes that have caches for caching the sensor data. The caches have multiple cache slots for storing sensor data having different expiry time and cache slots analogous to each other in various layers have similar expiry time. The sensor data cached in a cache slot at a non-leaf node at a layer may be obtained by aggregating corresponding sensor data stored at a preceding layer. The corresponding sensor data can be sensor data stored in corresponding cache slots of internal nodes and/or sensor data stored with leaf nodes at the preceding layer.

More particularly, the tree may be configured as a Collection R-Tree (or "COLR-Tree"), which is a spatial index built according to the techniques described herein, but loosely based on a classic R-Tree structure. One example technique of creating a COLR-Tree structure is described below in more detail with reference to FIGS. 4A, 6, and 8.

Once the set of sensors are identified, the query processing module 120 determines whether the sensor data stored in the cache slots of the nodes associated with the set of sensors satisfies the user's query. The sensor data may be presented to the user if found to be satisfactory. Alternatively, if the sensor data is found to be unsatisfactory, the appropriate sensors are polled and updated readings are inserted into the database. The aggregated updated readings may then be retrieved from the database and presented to the client devices 104 using the UI 116. To illustrate this architecture 100, consider the following example. Suppose a user at the client device 104-1 wants to know a recent temperature at a specific geographic location. The user submits a query for the recent temperature at the target location along with a time constraint, such as a specified expiry time for the recent temperature, using the UI 116 rendered on the client device 104-1. In response to the query, the recent temperature at the target location can be determined using temperature readings stored in the database 122 as explained below. The time constraint may restrict the use of a temperature reading which is not valid after a particular time, such as a temperature reading that has an expiry time less than the specified expiry time.

The server 102 receives the query and the query processing module 120 examines the query to determine the latitude and longitude of the target location. Subsequent to examination, the query processing module 120 reviews the data tree stored in the database 122 to identify a set of sensors having latitudes and longitudes within the target location and capable of providing sensor data that satisfies the time constraint. If the sensor data stored in the cache slots of the nodes associated with the set of sensors satisfy the time constraint, the sensor data may be presented to the user. Else, if the sensor data do not satisfy the time constraint, the query processing module 120 probes the set of sensors to obtain updated sensor readings, including temperature data. The updated sensor data is then formatted and presented to the user through the UI 116.

The server 102 includes a maintenance module 126 stored in the system memory 112 and executable on the processor(s) 110 to update the caches of the nodes in the index structures. Subsequent to collection of the updated sensor readings, the maintenance module 126 inserts the updated sensor readings into the caches of the nodes coupled to the set of sensors.

Further, the maintenance module 126 may compute updated sensor data at each layer from the updated sensor readings or sensor data at lower layer. Then, the updated sensor data is inserted into respective caches of the nodes. The maintenance module 126 and its functioning are explained in detail with reference to FIG. 3B.

Although the sensors 118 are shown accessible by the server 102, the sensors 118 may be accessible directly by the remote storage device 108. This allows the sensor metadata to be stored directly in the database 122 in response to probing the sensors by the indexing module 124. The sensor metadata stored in the remote storage device 108 is then indexed to form the data tree.

Figure 2:
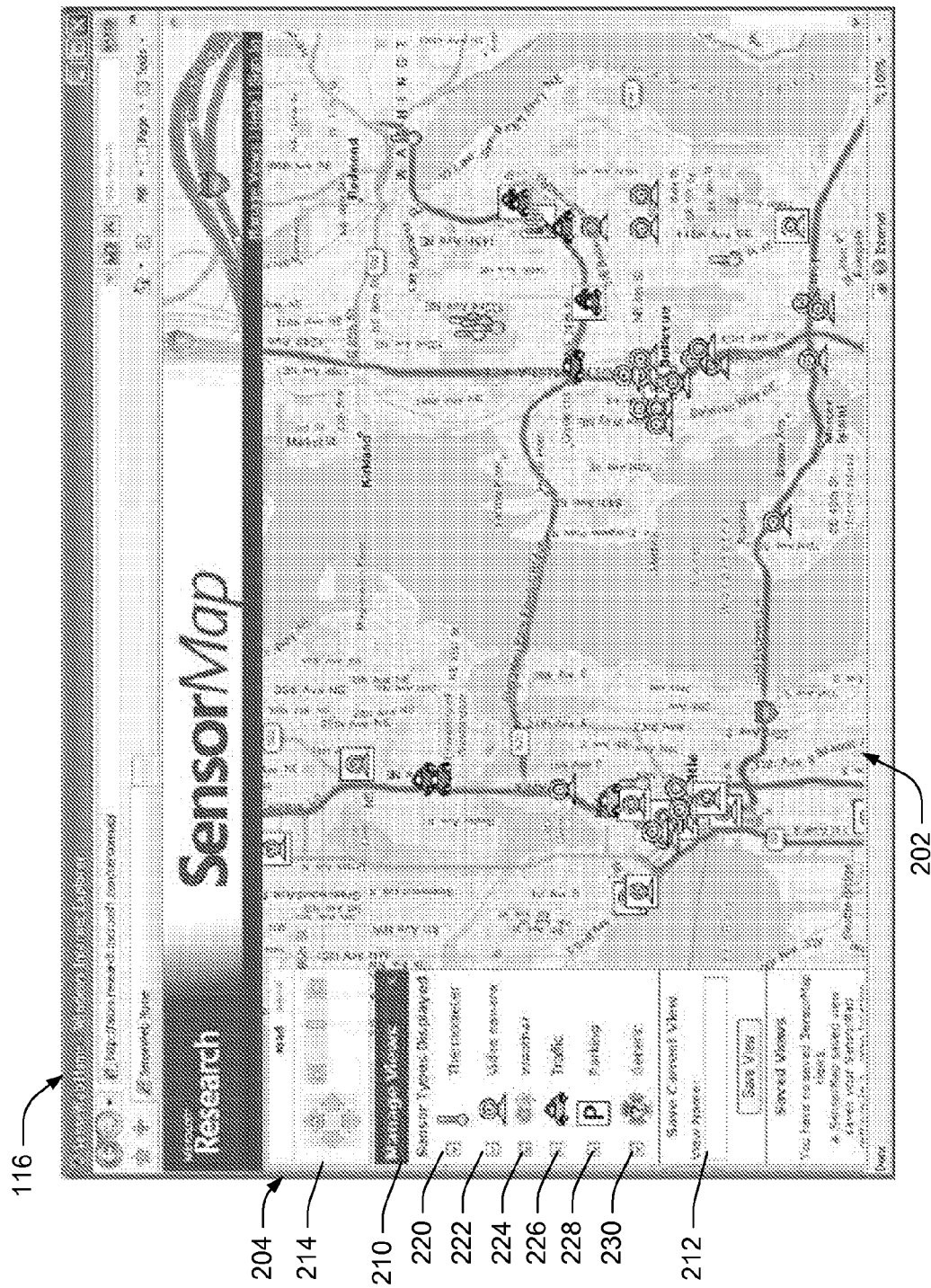
FIG. 2 illustrates an exemplary spatial and temporal sensor search user interface (UI) that facilitates submission of search queries and presents results of sensor data collected from various sensors in various locations according to the queries.

FIG. 2 illustrates the sensor search user interface (UI) 116 in more detail. In this example, search UI 116 is configured in the environment of depicting geographic locations of sensors within a certain region. Although not illustrated in this rendering, the UI 116 allows the user to draw arbitrary polygons to specify a search region. Thus, the user can form a box or rectangle, for example, around a portion of the map displayed in the UI 116 to designate an area of interest. Alternatively, the user may specify a search region by entering search keywords (e.g., "Seattle", "King County") or by entering phrases or sentences (e.g., "weather in Seattle", or "What is the traffic on I-90 and I5 interchange?"). The UI 116 further enables the user to specify freshness constraints/or time constraints of the sensor data in terms of how stale (or how recent) the sensor data is to be acceptable. For example, the user may specify that sensor data older than a particular time period (e.g., 10 minutes, 1 hour, 1 day, etc.) may not be acceptable. Thus, the user can obtain the latest sensor readings from all the locations. In another example, the user may specify that sensor data greater than a particular expiry time may not be acceptable. Once the user submits the query, the server 102 collects the appropriate data and returns it to the UI 116 for depiction in a results pane 202. In this illustration, a regional map of the cities of Seattle and Bellevue in Washington State is shown in the results pane 202, as well as various freeways and highways within this region. It should be noted that the sensor search UI 116 may be implemented in other environments, and display results of searches in other formats, including non-graphical and non-geographical presentations.

Next to the results pane 202 in the search UI 116 is a control panel 204 that enables a user to refine the search or navigate throughout the results. In the illustrated implementation, the control panel 204 has a sensor selection area 210, a view name entry area 212, and location viewing controls 214. The sensor selection area 210 provides various options that allow a user to define which sensor types to display in the results pane 202, since there may be many types of sensors located throughout a region. Representative sensors shown in the sensor selection area 210 include options for temperature sensors 220, video or web cameras 222, weather sensors 224, traffic sensors 226, parking sensors 228, and other generic sensors 230. Here, the user may check a corresponding box to have the sensor type displayed. The sensor types selected by the user are then represented by graphical icons on the map in the results pane 202.

The view name entry area 212 enables the user to name the search results view. Upon entry of the name, the user may actuate a control (e.g., "Save View" button or return key) to save that name. Once a particular search is named, the user may quickly rerun future searches for the same sensor data by simply selecting the view name. This is useful, for example, for the user who might like to know traffic conditions on a daily basis for the morning or evening commutes.

The location viewing controls 214 facilitates user navigation through various locations within the region in the results pane 202. The viewing controls 214 also provide additional control features (i.e. panning and zooming) to view sensors in each of the locations. Thus, the user may be provided with a facility to identify sensor densities (i.e. number of sensors) and types of sensors at different locations, thereby enabling the user to make a decision for selecting sensors prior to posting a request for sensor data.

The control panel 204 further allows users to refine the search. Notice, for example, that there may be a high density of sensors in certain key areas of the region, such as at freeway interchanges. A user may want to know the traffic status at a particular stretch of freeway within the region depicted in the results pane 202. The control panel 204 can be used to navigate through the location to find the stretch of road, limit display of only traffic sensors 226, and then ascertain the traffic sensor density (i.e. number of traffic sensors present in the particular location). A facility may be provided to identify locations of the traffic sensors 226 (i.e. latitude and longitude of locations of traffic sensors) within the target freeway or a list may be provided to allow the user to choose specific sensors along this stretch of road. Upon identifying target sensors, a new query may be submitted and processed to collect data only from the specified traffic sensors 226.

Although not shown in this screen shot, the control panel 204 also includes an entry area that allows the user to specify freshness constraints/or time constraints of the sensor data. The control panel 204 may have an input box that allows the user to enter an acceptable time period (e.g., 10 minutes or 1 hour) or it may have a menu of choices from which the user may select an appropriate period (e.g., 0-5 minutes, 5-15 minutes, 15-60 minutes, etc.). Alternatively, the system may be configured with predetermined freshness constraints that are transparent to the user. Hence, when ever a freshness constraint is invoked, the architecture updates the data on demand.

Exemplary Server Implementation

Figure 3A:
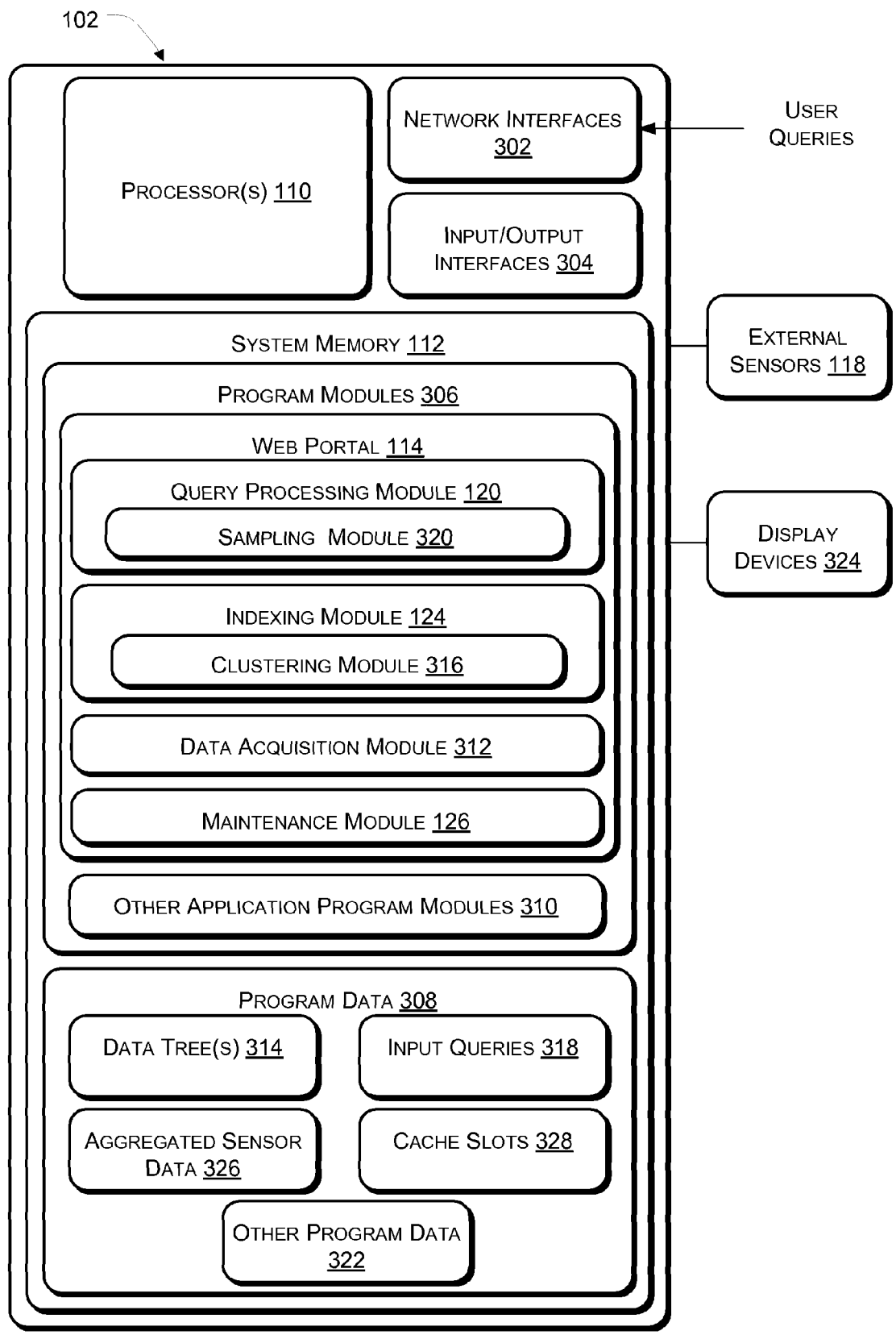
FIG. 3A is a block diagram of the server in FIG. 1, which is configured to process a query for sensor data and collect sensor data from one or more sensors defined in the query.

FIG. 3A shows certain functional aspects of the server system 102 in more detail. As noted earlier, the server system 102 includes processor(s) 110 and system memory 112. The server system 102 further includes network interfaces 302 to provide connectivity to a wide variety of networks, such as network 106, and protocol types such as wire networks (e.g., LAN, cable, etc.) and wireless networks (e.g., WLAN, cellular, satellite, etc.). Input/output interfaces 304 provide data input and output capabilities for the server system 102. The input/output interfaces 304 may include, for example, a mouse port, a keyboard port, etc.

The system memory 112 stores program modules 306 and program data 308. The program modules 306 include, for example, a web portal 114 and other application program modules 310 (e.g., an Operating System (OS) to provide a runtime environment, networked communications between multiple users, and so forth).

The web portal 114 has several responsibilities including acting as a front end or proxy to the sensor networks, performing the data collection by communicating with the sensor networks, and initiating query processing by the backend database by performing query translation. The web portal 114 also presents query results back to the client interface, such as through the UI 116. The presentation of results typically includes retrieving sensor data from sensor nodes in response to a user's query and displaying the sensor data. The sensor data may be retrieved from sensor readings previously stored at the nodes or from sensor readings freshly collected at the nodes based on the query or from a combination of the two.

The sensor data can also be computed by aggregating the sensor readings, if the user is not interested in visualizing the results of every single sensor node, especially in regions with a high sensor density. Further, the user may request fresh sensor data by specifying an expiry time. The fresh sensor data may be retrieved from the nodes based on expiry times of sensor readings previously stored and/or freshly collected at the nodes.

In one implementation described below in more detail, a technique of storing and updating the sensor readings at the nodes is used in which, the sensor readings are stored in various cache slots at the nodes based on expiry times of the sensor readings. The sensor data can be retrieved from the cache slots based on the user's query. Further, in such an implementation, the choice of sensors over which to aggregate is decided dynamically using a pixel-based clustering algorithm that groups sensors lying within a distance corresponding to an n×n block of pixels (where n is a system parameter, but is typically small such as 5×5).

As noted earlier, the system 102 may be employed for identifying, capturing, and indexing the metadata associated with the external sensors 118 of various sensor networks as well as for subsequently providing and presenting desired sensor data specified by a user via a UI 116. As such, the web portal 114 includes a query processing module 120 to handle user queries, an indexing module 124 to index the metadata into a structure, a data acquisition module 312 to acquire data from the sensors, and a maintenance module 126 to update and maintain the data in the data tree 314. In the following discussion, components of the server system 102 used to identify and index the sensor metadata are described first, followed by an explanation of components involved in presenting desired sensor data specified by a user.

The server system 102 collects and stores metadata received from the external sensors 118 of various sensor networks. The metadata may be provided and registered by sensor network administrators. The metadata may include, for example, locations of the external sensors 118 and schemas that define how sensor readings are formatted and how to retrieve that information. From the metadata, the indexing module 124 creates an index structure, such as the data tree(s) 314, and stores that the data trees 314 as the program data 308 in the system memory 112.

In one implementation, the indexing module 124 is configured to cluster nodes in the data tree(s) 314 into groups of nodes such that the tree has a hierarchical structure with one or more layers. More specifically, the indexing module 124 includes a clustering module 316 configured to cluster the metadata of the sensors 118 into various groups of metadata based on various factors, such as sensor location and sensor type. Subsequent to creating the groups, the clustering module 316 constructs layers of the groups of nodes to form the data tree(s) 314. Each layer includes multiple nodes, and individual nodes store metadata of corresponding external sensors 118. This process may be performed on a layer by layer basis, where each layer is created successively beginning with the lowest layer. Within the hierarchical arrangement, the nodes may be said to include parent nodes associated with the external sensors 118 and child nodes associated with locations of the external sensors 118. The bottom-most child nodes are leaf nodes directly associated with sensors and do not have any nodes dependent therefrom. The parent nodes include internal nodes having one or more leaf nodes and/or internal nodes dependent therefrom. Further, each node of the data tree(s) 314 is provided with associated caches to store sensor readings collected from the respective external sensors 118. The caches of the leaf nodes store leaf sensor data obtained from associated sensors and the internal nodes include caches for storing internal sensor data having different expiry time periods. Each cache of an internal node has multiple cache slots of fixed time periods. The number of cache slots in a cache may be varied according to requirements of applications. The expiry time periods of the cache slots are synchronized across the data tree 314 such that similar expiry time periods are assigned to identical cache slots of the internal nodes in various layers. The expiry time periods are assigned based on the expiry time of sensor readings stored in the cache slots.

The cache slots of a cache at a node may be grouped together to represent a global window that denotes an upper bound on the duration of maintaining a sensor reading in the cache. When a sensor reading is received at a node, a timestamp denoting an expiry time of the sensor reading is identified. The sensor reading is then inserted into a cache slot using a hash function on their timestamps. Such insertion is performed subsequent to comparison of the timestamp associated with the sensor reading with a scope of the global window. Thus, if the comparison shows that the sensor reading timestamp is outside the scope of the window, then the window may be expanded to cover the sensor reading timestamp. The maintenance module 126 is used to update sensor readings in the cache slots which will be explained in detail in FIG. 3B.

Figure 4A:
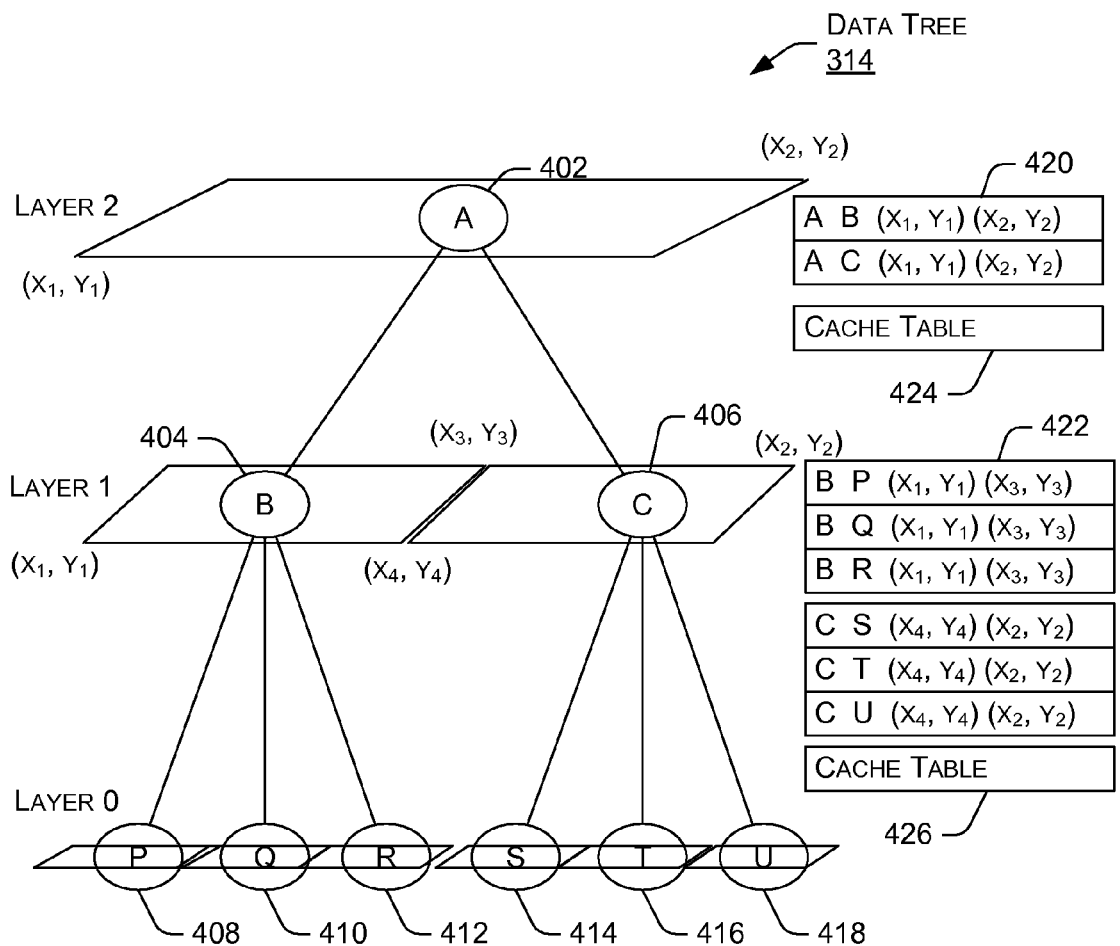
FIG. 4A illustrates one example of a data tree structure having nodes associated with sensors.

FIG. 4A shows one example structure of the data tree(s) 314 in more detail. For discussion purposes, the data tree(s) 314 is shown to include caches at leaf nodes and internal nodes. However, each cache at an internal node can have multiple cache slots which will be explained in detail later with reference to FIGS. 4B and 4C.

The data tree(s) 314 has multiple layers of nodes 402-418. Each node is associated with at least one external sensor 118. As shown, the data tree(s) 314 has a top layer with a parent node 402 corresponding to a main sensor in a sensor network. The parent node 402 is illustrated with two child nodes 404 and 406 that form a middle layer. These middle-layer child nodes 404 and 406 may each have one or more children, as represented by two sets of three child nodes in which nodes 408, 410, and 412 are children of node 404 and nodes 414, 416, and 418 are children of node 406. These last nodes 408-418 form leaf nodes of the data tree(s) 314 in that there are no further child nodes dependent from them. The leaf nodes 408-418 form a bottom layer of the tree.

Each node in each layer of the data tree(s) structure 314 has an associated cache to store sensor readings obtained from the external sensors 118. During a process of collecting sensor readings, sensor readings from a plurality of the external sensors 118 are stored in the caches associated with the leaf nodes 408-418. Further, the nodes 404 and 406 of the middle layer may store a processed version of the sensor readings of respective child nodes. For instance, a cache of the node 404 stores processed versions of the sensor readings stored in the child nodes 408, 410, and 412. The processed version may be an average of the sensor readings. Further, a cache of the root node 402 at the upper layer may store data obtained by processing the sensor readings stored in caches associated with the child nodes 404 and 406 in the middle layer, such as averaging the sensor readings in the caches of the child nodes 404 and 406.

In one implementation, the data tree(s) structure 314 is configured as a Collection R-Tree (or "COLR-Tree"), which provides a spatial index of sensors in the sensor networks. Each layer 0, 1, 2 in the data tree(s) 314 has an associated table, as represented by table 420 for layer 2 and table 422 for layer 1. The layer tables 420 and 422 have columns representing an identifier for a parent node, an identifier for a child node, and any metadata corresponding to that child node. Here, the metadata is spatial metadata indicating a bounding box in terms of (x, y) coordinates of the child node and the number of sensors below the child node. Notice that the bounding box of the root node 402 is roughly the combined size of the boxes for the leaf nodes 408-418 descendant from the root node 402. The bounding boxes represent geographical regions within which sensors associated with the nodes are positioned. Thus, the root node 402 contains sensor data that is an aggregate (e.g., average) of data obtained from multiple sensors in lower layers.

There is one row in the layer tables for each child node. The layer tables 420 and 422 are associated with each other in that child identifiers in an upper level layer table are present as node identifiers in a lower level layer table. The data tree(s) 314 is traversed by obtaining following successive child identifiers through the layer tables 420 and 422. Each layer table has a corresponding cache table, as represented by cache tables 424 and 426. Each cache table stores cached sensor readings of nodes within the layer. The cache tables 424 and 426 contain a node ID, a cache having one or more cache slots with values representing the (possibly aggregated) readings along with their timestamps, a slot ID, and the number of descendant leaves in the sub tree.

The data tree(s) 314 (COLR-tree structure) may be constructed by the indexing module 124 in a bottom-up fashion from the lower layer of nodes to the upper layer. In one approach, the indexing module 124 clusters sensor metadata using a k-means clustering technique (i.e., an algorithm to cluster objects based on attributes into k partitions or clusters) based on the geographic proximity of the sensors. This process is repeated to construct the data tree(s) 314 one layer at a time, terminating at the construction of a single cluster which becomes the root of our index.

In another implementation, the clustering module 316 constructs multiple data tree(s) 314 simultaneously. Further, one or two sets of data tree(s) 314 may be linked to each by the clustering module 316, assuming a relation between the sets of data tree(s) 314 may be identified.

After the data tree(s) 314 has been constructed and stored, the system 102 is ready to accept queries and process those queries to return sensor data requested by the users. User input queries are received from the client devices 104 over the network 106 via the network interfaces 302, or obtained from the input/output interfaces 304, and are passed on to the query processing module 120 for processing. The input queries 318 are shown stored as the program data 308 in FIG. 3A and are accessible to the processor(s) 110 during processing. The query processing module 120 examines the input queries 318 to identify a target data tree that has a set of external sensors 118 that are likely to satisfy information specified in the input queries 318 by the users. The information may include, for example, location of the external sensors 118, spatial properties of the external sensors 118 (i.e. spatial skewed distribution of sensors in each sensor networks or angle of location of the sensors), number of sensor readings, sensor readings having specified expiry time, and so forth.

Once a target data tree is identified, the query processing module 120 identifies a set of external sensors 118 represented by nodes within the data tree(s) 314 from which to provide a response to the input queries 318. In one implementation, the query processing module 120 employs a sampling module 320 to conduct a layered sampling process that leverages the index structure of the target data tree to produce a random subset of sensors with a similar spatial distribution to the original set of sensors. As a result, the sampling process reduces the number of the external sensors 118 to be probed for sensor readings, and yet still provide an accurate response to user queries (i.e. input queries 318). Thus, the sampling process reduces the communication cost and end-to-end latency in providing the sensor data from the time of receipt of the input queries 318 by the system 102.

Generally, layered sampling allows siblings in the data tree(s) 314 to independently choose samples from their descendants. A user specifies a sample target size (i.e., the number of sensors to be read). Starting at the root node, with the user-specified sample target size, the sampling module 320 first examines the cache tables at each layer to determine whether current data exists. Depending upon the data in the cache, the sampling module 320 decides how many additional samples are needed. Thereafter, the sampling module 320 traverses through the target data tree, descending along nodes relevant to the query and splitting the target size amongst the child nodes. Thus, each child node is asked to return a sample smaller than the original target size, so that consequently when the samples from each child node are combined, the original size goal is met. The sampling traversal terminates when a node is assigned a target size smaller than a value of one.

More particularly, in the present implementation, the sampling module 320 may assign a target size at a node as 'r' and define a target size at one of its child nodes as '$r_i$'. The target size of the child nodes may be computed as:

$$r_i = r \times \frac{w_i}{\sum_i w_i} \quad (1)$$

where '$w_i$' is a number of sensors that are descendents of child node 'i' of the current node (parent node or root node of the data tree). Thus, the above equation (1) denotes that the sample target size is divided and allocated to each sensor present at the branches of the current node. Such allocation process results in the identification of a smaller sample of nodes associated with lesser number of sensors than a desired number of external sensors 118. For example, the sampling module 320 may need to identify a set of prominent temperature sensors from a location having a high density of temperature sensors (i.e. higher number of temperature sensors). The sampling module 320 may review the target data tree and distribute the target size specified by the user amongst the nodes in a layer by layer fashion. Implementation of such a process results in the elimination of nodes having target sizes less than one. Thus, the sensor data may be collected from a set of sensors having fewer sensors, thereby reducing a time delay in collection and presentation to the user.

In one exemplary implementation, the sampling module 320 may be configured to eliminate some child nodes that may not possess any sensor readings that can contribute to the sensor data. In such a case, the sampling module 320 may allocate a larger fraction of the sample target size to each child node. Thus, the larger fraction of the target size assigned to the child nodes can be computed as:

$$r_i = r \times \frac{w_i}{\sum_i w_i \times [|\text{overlap}(BB(i), q)|]} \quad (2)$$

where '$w_i$' is a number of sensors that are descendents of child node 'i' of the current node, 'overlap' denotes an indicator function that represents a maximum number of nodes in the target data tree that may satisfy the query rather than the total number of sensors descending the current node.

For example, the sampling module 320 may split the target size of temperature sensors (i.e. for a specified temperature data in a location) unequally amongst the child nodes by assigning a larger target size and a smaller target size to higher weighted nodes and lower weighted nodes, respectively. Such a process may be implemented to further reduce the number of sample sensors by eliminating the sensors that may not overlap with the user's query (i.e. may not contribute to the user's query) thereby reducing the end-to-end latency.

In yet another implementation, child nodes possessing sensor readings in the caches, stored during any of the previous traversals through the target data tree by the sampling module 320, may be eliminated to reduce the number of sample sensors. In such a scenario, the sampling module 320 may deduct the child nodes having the sensor readings in the caches. Thus the target size of the child nodes 'i' can be computed as:

$$r_i = r \times \frac{w_i - c_i}{\sum_i w_i \times [|\text{overlap}(BB(i), q)|]} \quad (3)$$

where '$w_i$' is a number of sensors that are descendents of child node 'i' of the current node, 'overlap' denotes an indicator function that represents a maximum number of nodes in the target data tree that may satisfy the query rather than the total number of sensors descending the current node, and '$c_i$' denotes the number of sensors already cached. The sampling weight corresponds to an aggregate of the values of number of sensors having the sensor readings pre-stored in the cache.

For example, upon traversing through the target data tree to identify a set of temperature sensors, the sampling module 320 may determine the nodes having the latest temperature readings stored in the caches. In such a case, nodes associated with the set of temperature sensors may be deducted from the number of nodes that are descendants of a child node of the any of parent nodes associated with the set of temperature sensors.

In one exemplary implementation, the sampling module 320 may determine the smaller sample of nodes by performing all the techniques simultaneously, as described above according to equations (1), (2) and (3) thereby reducing the end-to-end latency. Further, it may be noted that the sampling module 320 can determine the smaller sample of nodes employing the techniques as described in equations (1), (2) and (3) in various combinations.

Further, a user may specify a time constraint such as a specified expiry time. The smaller sample of nodes is then examined by the query processing module 120 to identify whether cache of the nodes store sensor data having expiry times greater than the specified expiry time. Once the smaller sample of nodes is identified as capable of providing queried sensor data, the smaller sample of nodes is sent to the data acquisition module 312. The data acquisition module 312 probes the sensors to collect fresh sensor readings if pre-stored sensor readings do not satisfy the time constraint. The fresh sensor readings collected by the sensors are stored in the caches of respective nodes and displayed to the user on the UI 116 through the display devices 324.

Figure 3B:
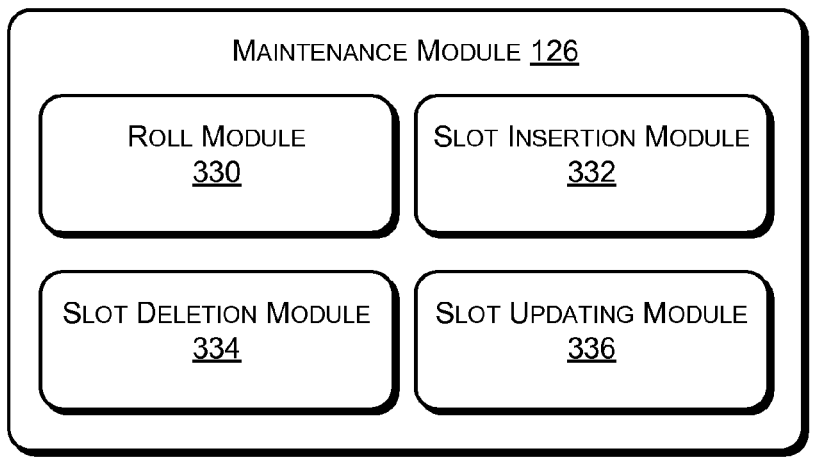
FIG. 3B is a block diagram of an exemplary maintenance module that is configured to maintain sensor data stored in cache slots of nodes.

FIG. 3B illustrates an exemplary maintenance module 126. The maintenance module 126 inserts the sensor readings collected by sensors into the respective cache slots at the leaf nodes 408-418. Further, the maintenance module 126 may be employed for inserting the updated sensor readings to respective cache slots, deleting sensor readings in the leaf nodes 408-418 and updating the cache tables 424 and 426. As such, the maintenance module 126 includes a roll module 330, a slot insertion module 332, a slot deletion module 334, and a slot updating module 336. The roll module 330 manages global window expansion, slot identifiers denoting the cache slots, and alignment of cache slots of the nodes. The slot insertion module 332 updates the cache slots with fresh sensor readings and removes excess sensor readings in the cache slots. The slot deletion module 334 deletes excess sensor readings in the cache slots of leaf nodes 408-418 and updates sample weights in the cache tables 424 and 426. The slot updating module 336 updates the cache tables associated with non-leaf nodes.

A sensor reading having an expiry time greater than preset expiry times configured in the global window may be received by the server 102 and processed by the roll module 330. The roll module 330 extends the preset expiry times of the global window to include the expiry time of the sensor reading. The slot insertion module 332 receives the sensor reading from a leaf node and inserts a processed version of the sensor reading in a cache slot of an internal node that depends on the leaf node. For example, a fresh sensor reading may be received at node 408 of data tree 314. Thus, an internal node 404 at layer 1 may be updated with a processed sensor reading (i.e. aggregate value of the fresh sensor reading and previously stored or freshly stored sensor readings at nodes 410 and 412). In such a scenario, subsequent to insertion, the slot insertion module 332 may employ implementing a cache size constraint by a recently fetched replacement policy for checking size of the cache slots and eliminating excess readings stored in the cache slots of the leaf nodes 408-415.

Once a cache size is identified as greater than a cache size constraint, the slot deletion module 334 deletes the cache slots by a user to make the cache size fall within the cache size constraint. Thereafter, the slot deletion module 334 initiates propagation of the deletion upwards in the data tree(s) 314. Further, the slot deletion module 334 issues an update statement to update the cache tables associated with higher layers of the data tree 314.

The slot updating module 336 updates sample weights and aggregates the sensor readings stored in each layers through all the cache tables, such as cache tables 424 and 426. The aggregation may include for example, increment operation, decrement operation, and other operation depending on an aggregate function.

Figure 4B:
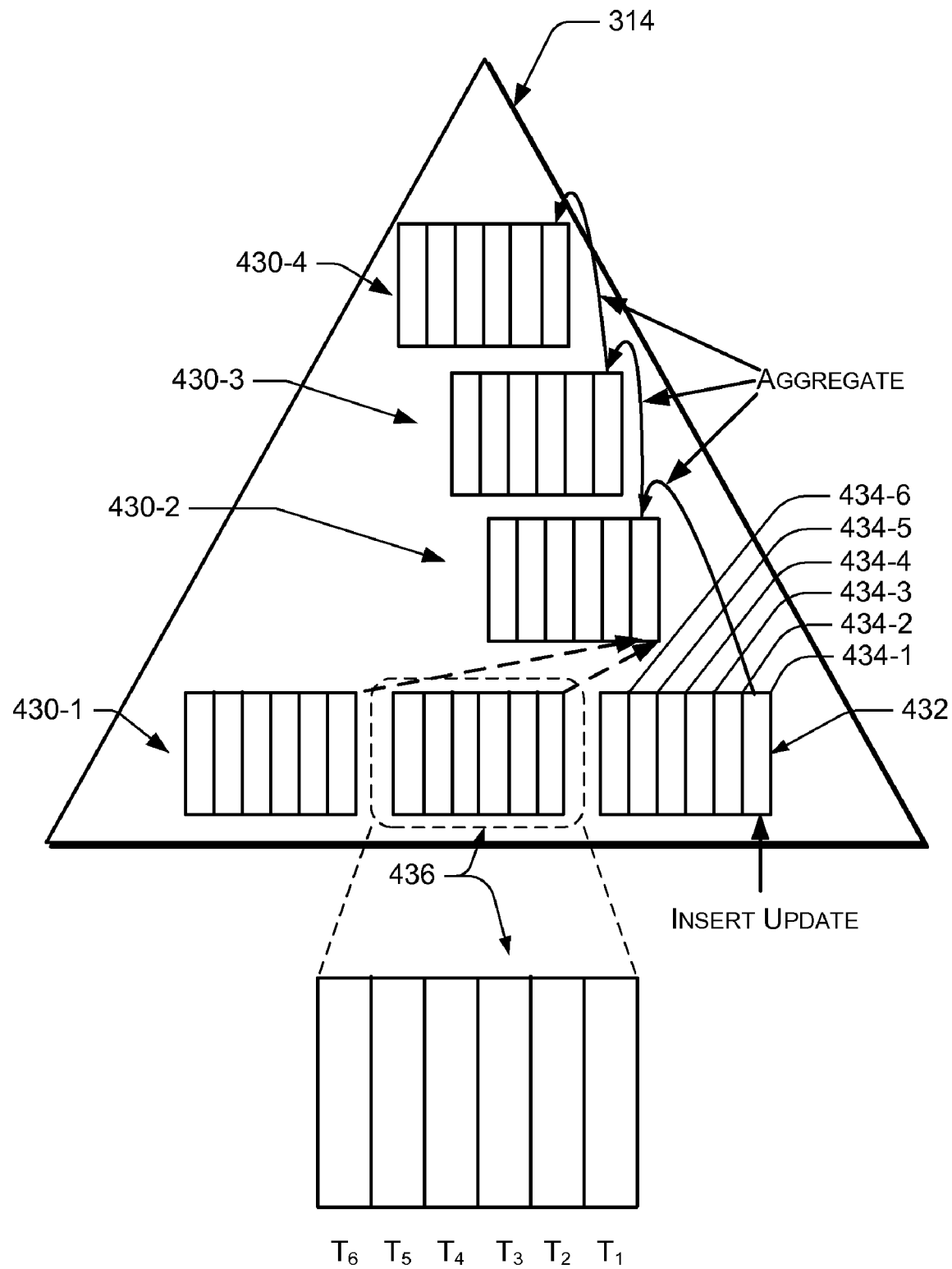
FIG. 4B illustrates an exemplary technique of updating a data tree.

FIG. 4B illustrates an exemplary technique of updating the data tree 314. The new sensor reading received by slot insertion module 332 may be inserted into a cache 432 of a non-leaf node at a layer 430-1. The cache 432 includes six cache slots 434-1, 434-2, 434-3, 434-4, 434-5, and 434-6 having various expiry times. As shown in FIG. 4B, a cache 436 in level 430-1 has six cache slots with associated expiration times $T_1$-$T_6$. That is, the cache slots are based on time ranges. Here, from right to left, the cache slots contain sensor data that expires within time periods $T_1$, $T_2$, $T_3$, $T_4$, $T_5$, and $T_6$. These expiration time periods may be of equal duration (e.g., $T_1$=0-2 minutes; $T_2$=2-4 minutes; $T_3$=4-6 minutes; $T_4$=6-8 minutes; $T_5$=8-10 minutes; and $T_6$=10+ minutes), or they may be of different durations (e.g., $T_1$=0-2 minutes; $T_2$=2-5 minutes; $T_3$=5-15 minutes; $T_4$=15-60 minutes; $T_5$=60 minutes to 2 hours; and $T_6$=anything over 2 hours). However, the six cache slots are synchronized throughout the data tree 314 such that $T_1$ in one cache at one node represents the same duration as $T_1$ in another cache at another node.

As data expires, the slots are reassigned to hold data with the longest expiration periods. For instance, suppose the first slot with time period T1 has data set to expire within 2 minutes (i.e., T1=0-2 minutes). After two minutes, the data in this slot is discarded or otherwise marked as stale. Notice that the remaining data in the other slots are not discarded or marked as stale. The first slot is then reallocated to hold data with the longest expiration periods, such as any data set to expire more than ten minutes later.

FIG. 4B shows the insertion of the new sensor reading in the first cache slot 434-1 having a predefined expiry time period corresponding to the expiry time of the new sensor reading. Such an insertion at the layer 430-1 results in a bottom-up dataflow through node caches of the data tree 314. The bottom-up data flow may include updating cache slots having similar expiry time periods as cache slot 434-1 in higher layers 430-2, 430-3, and 430-4 of data tree 314 with a processed sensor reading. The processed sensor reading to be inserted into a cache slot at a node of the layer 430-2, for example, may be obtained by aggregating (here, aggregation is denoted by arrows) the sensor readings stored in corresponding cache slots of nodes in the layer 430-1 along with the new sensor reading. Further, corresponding cache slots of nodes in the layers 430-3 and 430-4 are updated with processed sensor readings obtained by an aggregation of sensor readings in the corresponding cache slots of nodes in preceding lower layers 430-2 and 430-3, respectively.

In an exemplary implementation, the cache slots are updated through each middle layer of the data tree 314 and propagated to the topmost layer 430-4 (or root node). Further, the aggregation of sensor readings for the remaining upper layers (i.e. layers 430-3 and 430-4) may be performed while processing a query from a user. For example, when a new temperature reading is inserted in a cache slot at a lower layer, such as in 430-1, the corresponding cache slots of the upper layers 430-2 and 430-3 may be updated using the aggregation technique. Updating corresponding cache slots of the layer 430-4 can be implemented during traversal of the data tree 314 while processing the user's query.

Figure 4C:
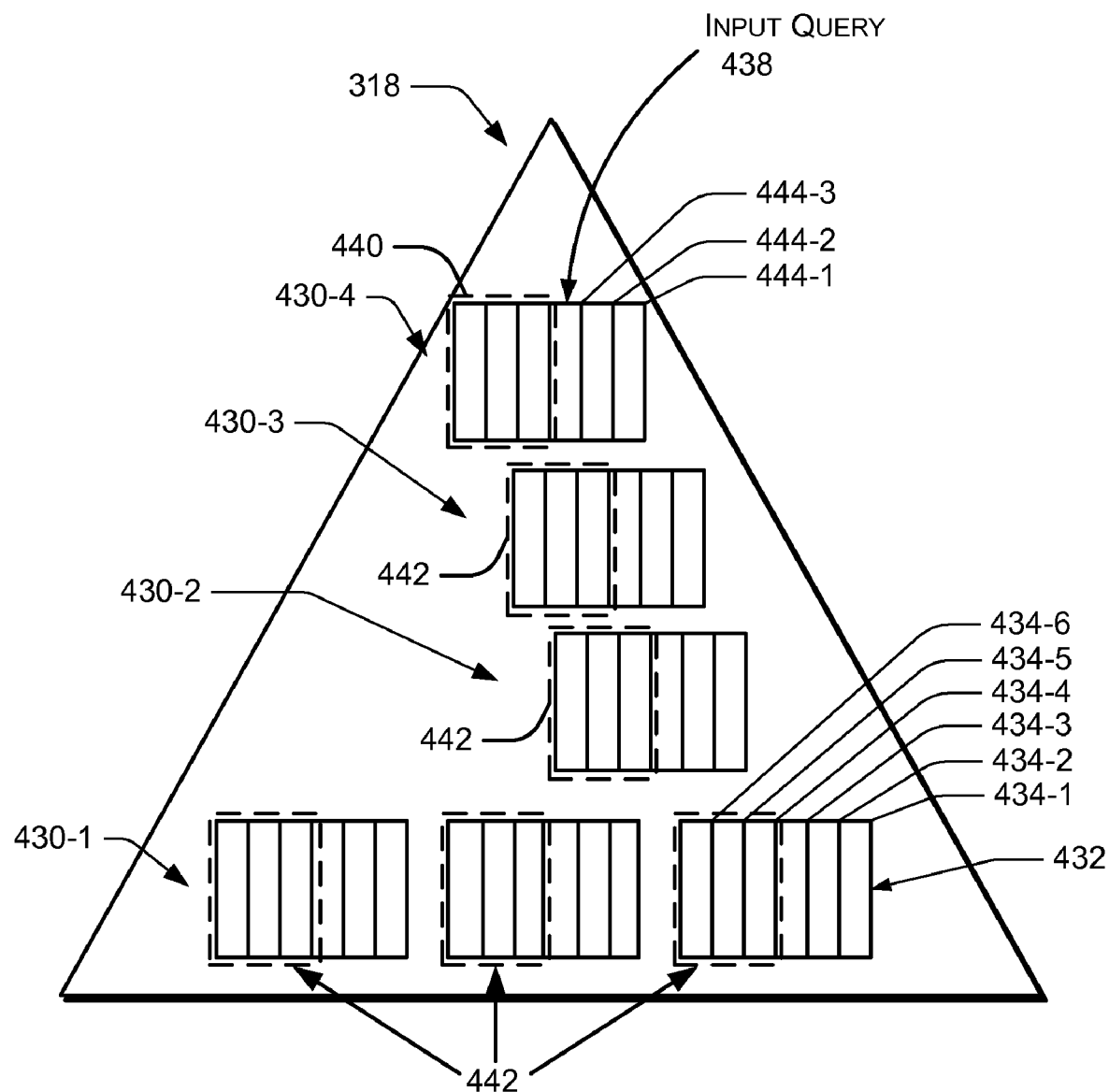
FIG. 4C illustrates an exemplary technique of traversing a data tree for identifying nodes contributing to sensor data requested in a query.

FIG. 4C illustrates an exemplary technique of traversing the data tree 314 to identify cache slots that might contribute to particular sensor data requested in a query. Suppose an input query 438 requests certain sensor data associated with a spatial region and having an expiry time greater than a specified expiry time. The input query is received by the query processing module 120 and processed to ascertain a set of nodes that contribute to the sensor data by traversing through the data tree 314. The query processing module 120 employs a lookup algorithm to traverse from the root layer 430-4 (topmost layer) to the leaf layer 430-1 of the data tree 314.

While traversing through the data tree 314 in response to the input query 438, the query processing module 120 identifies stale slots 440 at the internal node within root layer 430-4 as containing data that has expired in the layers 430-1, 430-2, 430-3, and 430-4 that may not contribute to the sensor data. Thus, cache slots 442 at nodes in lower layers 430-3, 430-2, and 430-1 that correspond to the stale slots 440 at the node in the root layer 430-4 are also identified as stale slots and are not used while retrieving sensor readings.

Further, the query processing module 120 may identify relevant cache slots at the layer 430-4, such as cache slots 444-1, 444-2, and 444-3, that may contribute to the sensor data to be returned in response to the input query. Upon identifying the relevant cache slots, the query processing module 120 traverses down the data tree 314 to identify corresponding cache slots at lower layers 430-3, 430-2, and 430-1. The data acquisition module 312 acquires the sensor data and presents that data to the user.

The sensor data provided to the user may be an aggregate of updated sensor data stored in the relevant cache slots at the layer 430-4. For example, suppose a user requests sensor data in a spatial region that expires after 3 minutes. Further, suppose cache slots 444-1, 444-2, and 444-3 having expiry time periods of 0-2 minutes, 2-4 minutes, and 4-6 minutes, respectively. In such a scenario, the query processing module 120 traverses the set of cache slots in the data tree 314 to identify caches at leaf nodes having potentially fresh sensor readings (i.e. sensor readings having an expiry time less than or equal to 3 minutes). In this case, the first and second cache slots corresponding to slots 444-1 and 444-2 contain such data. The potentially fresh sensor readings are acquired and propagated upwards in the set of cache slots such that the cache slots 444-1 and 444-2 receive the processed and potentially fresh sensor readings. This aggregated data is returned in response to the query and presented to the user.

Operation

Figure 5:
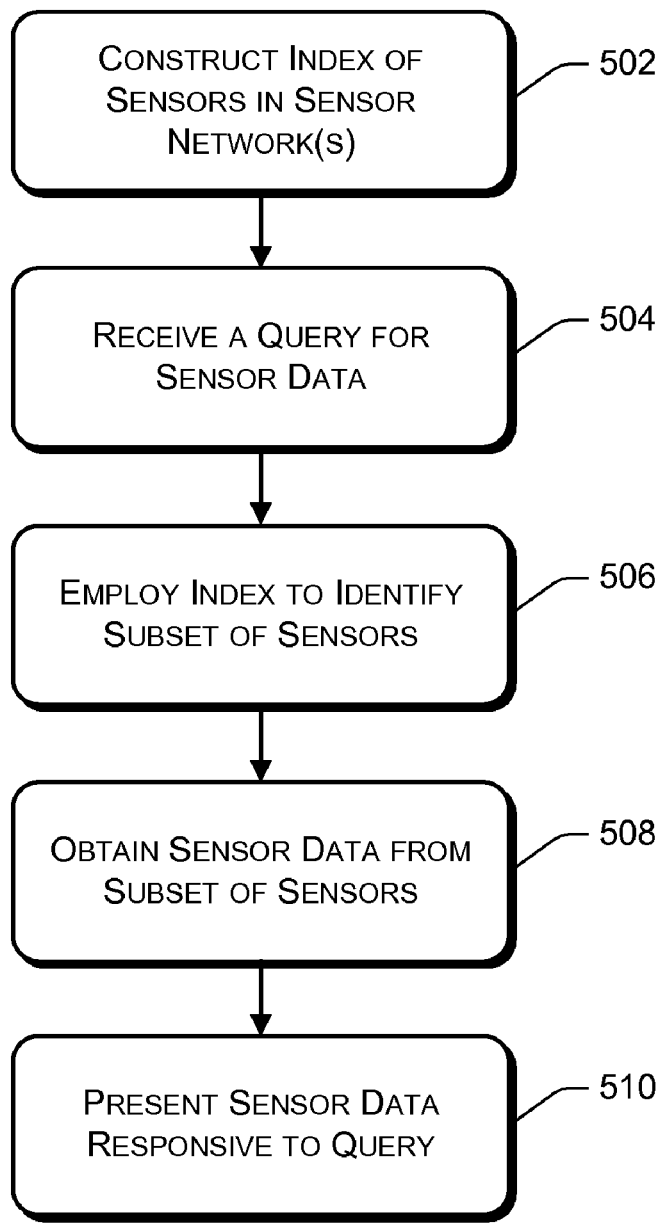
FIG. 5 is a flow diagram of a process for performing communication efficient spatial searches for sensor data based on a user's query.
Figure 8:
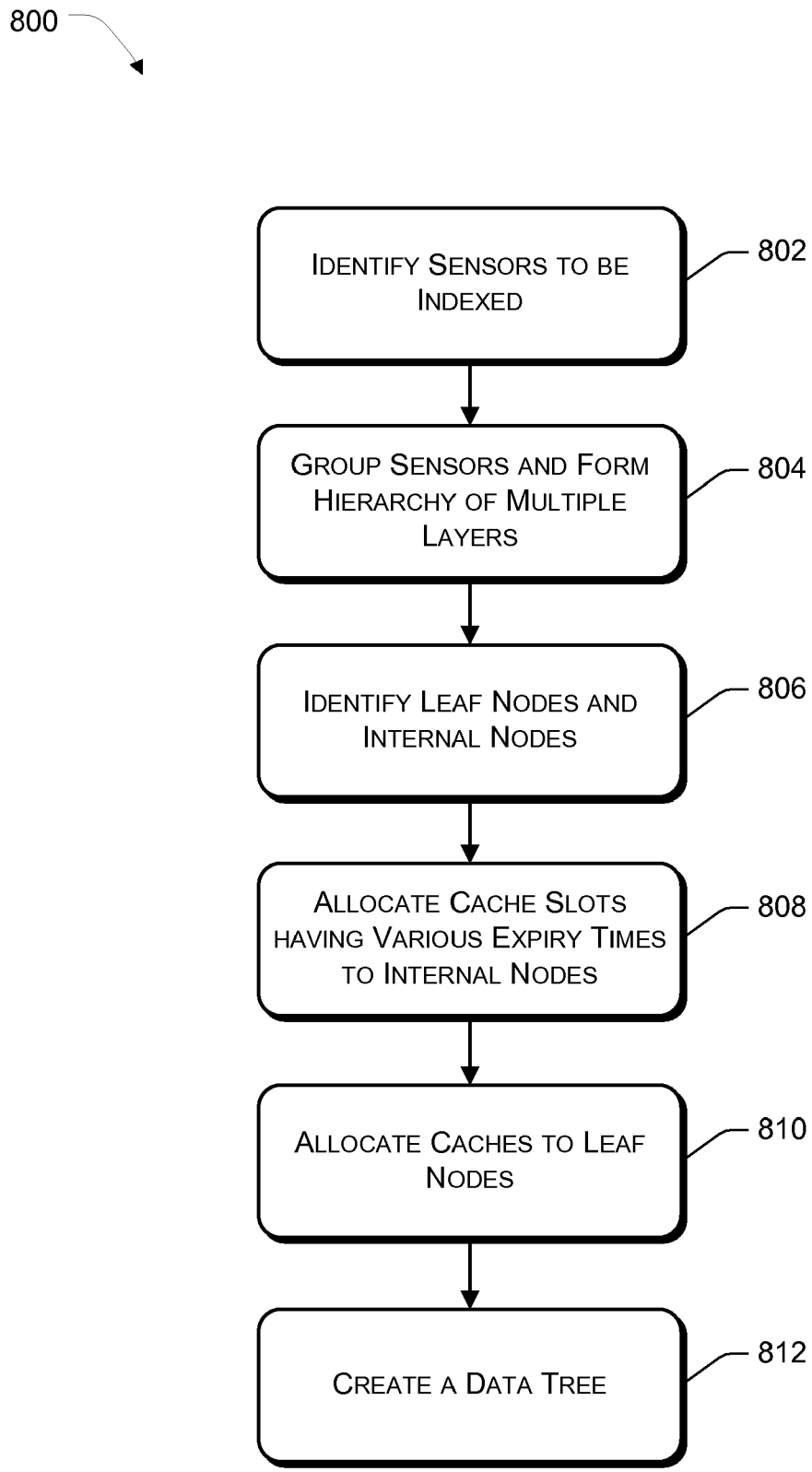
FIG. 8 is an exemplary process for creating a data tree including nodes arranged based on a spatial distribution of sensors associated with nodes and nodes allotted with cache slots to cache sensor data.
Figure 9:
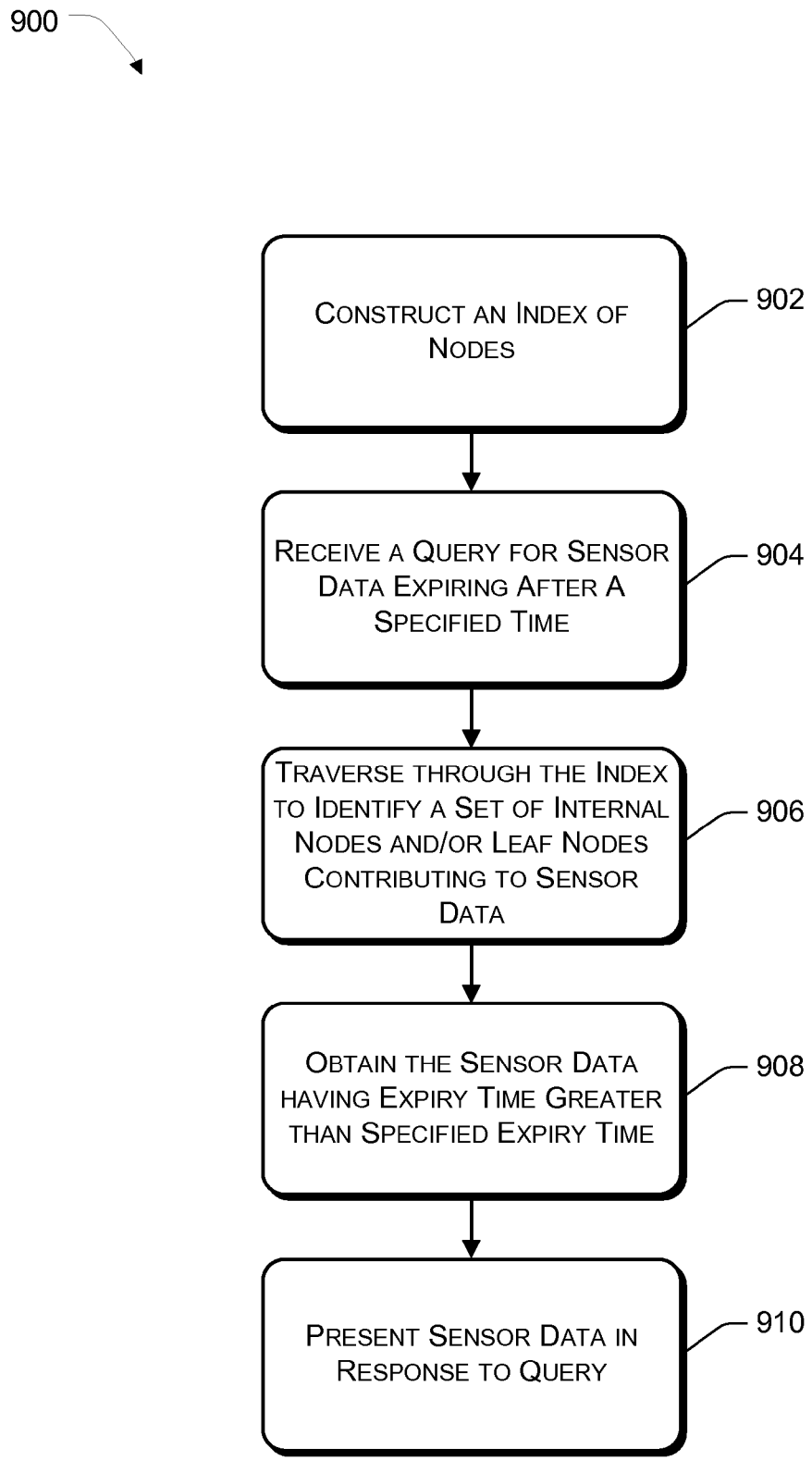
FIG. 9 is an exemplary flow diagram of a process for obtaining sensor data from an index of nodes based on a user's query.

Exemplary processes for operating a sensor data web portal to conduct communication efficient spatial searches for sensor data are described in this section with additional reference to FIGS. 1-4C. FIG. 5 provides an overview of performing communication efficient spatial searches, while FIGS. 6 and 7 offer more detailed implementations of creating an index of sensors and processing queries using the index. Further, FIGS. 8 and 9 provide detailed implementations of creating an index of sensors having nodes with cache slots for storing sensor data and identifying sensor data having an expiry time that satisfies a user's query. The exemplary processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

FIG. 5 illustrates a general overall process 500 for performing communication efficient spatial searches for sensor data based on a user's query. The process 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. The order in which the process is described is not intended to be construed as a limitation, and any number of the described blocks can be combined in any order to implement the process, or an alternate process. Additionally, individual blocks may be deleted from the process without departing from the spirit and scope of the subject matter described herein. For discussion purposes, the process 500 is described with reference to environment shown in FIG. 1 and system 102 shown in FIG. 3A.

At 502, an index of geographically-distributed sensors is constructed and stored. In one context, the sensors capture data pertaining to weather, traffic, parking, security, real-time views, and so forth. In building this index, a sensor registration process may be conducted, where sensor network administrators provide metadata including sensor locations and schemas of sensor readings. The metadata may include, for example, sensor location, type of sensor, schema for sensor readings, and so forth.

In one approach, index construction is initiated with the hierarchical clustering algorithm described above, which constructs one layer of the index at a time from the metadata. According to one implementation, the index is formed as a data tree with multiple layers of nodes, where individual nodes are associated with caches to store metadata of the external sensors 118. One example data tree(s) 314 is shown in FIGS. 4A-4C. The administrator may modify the index by eliminating certain sensors which may not be deemed useful, or alternatively may specify a selected number of sensors for any particular location.

At 504, a query for sensor data is received. The query may be submitted by users via the UI 116 on the client devices 104 and routed to the server 102 via the network 106. The query processing module 120 may review the query to identify certain information, such as location of sensors, number of sensors (i.e. external sensors), and so forth. The query may further include the identity of certain external sensors 118 or indicate a physical boundary of a particular area in which the sensors exist. For example, if the user is interested in a location with a high density of traffic sensors, the user may input a geographical range within which traffic sensors may be sampled.

At 506, a subset of the sensors from which to obtain data that would satisfy the query is identified using the index. In one implementation, the smallest possible number of nodes is determined. The number of sensors in the subset may be specified in the user query, or chosen by the system administrator as a controllable parameter. The sensors forming the subset are then selected randomly from the index to exhibit a spatial distribution similar to the complete set of sensors.

At 508, sensor data is obtained from the subset of sensors. The sensor data may be retrieved from caches associated with the sensors, or alternatively the data acquisition module 312 may poll the subset of sensors and collect updated sensor readings on demand.

At 510, the sensor data is formatted and presented to the user in a manner responsive to the user query. The sample sensor data may be displayed through the UI 116, as shown in FIG. 2.

Figure 6:
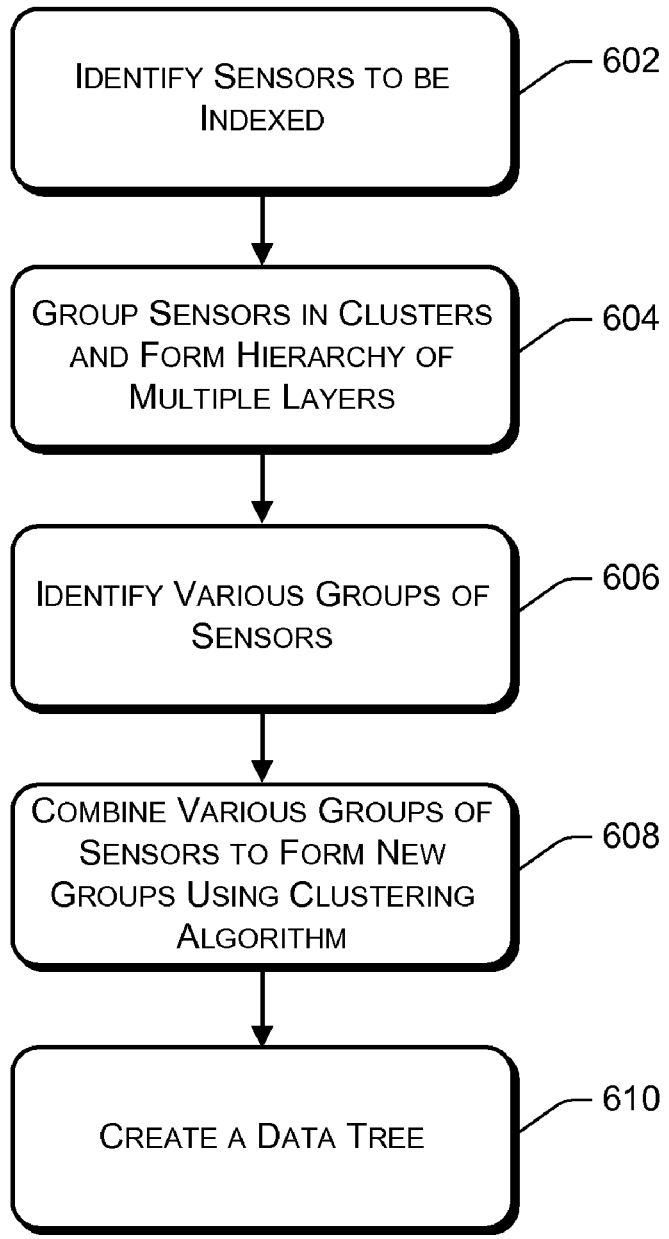
FIG. 6 is a flow diagram of a process for creating a data tree based on a spatial distribution of sensors, such as that shown in FIG. 4.

FIG. 6 illustrates an exemplary process 600 for creating a data tree in more detail. At 602, sensors to be included in an index are identified. This may be accomplished through a registration process, for example, where sensor network administrators register sensors with the web portal. The administrators may submit metadata on the sensors including sensor type, location, schemas, and so on.

At 604, sensors to be represented in the index are clustered together to form groups. In one implementation, the clustering module 316 runs a clustering algorithm to form the groups of sensors. The clustering may be based on one or more criteria, such as sensor type, location, and so forth. As shown in FIG. 4A, for example, clustering module 316 creates a bottom layer (i.e., layer 0) of all possible sensors to be represented by the index. The clustering process may then be repeated to form successively higher layers up to top layer with a single root node.

At 606, various groups of sensors that may be interlinked in some manner are identified. As one example, external sensors 118 located in smaller areas within a particular location may be aggregated to form a group.

At 608, the various groups of sensors can be combined to form new larger groups of sensors. In one technique, a clustering algorithm employs a pixel-based clustering algorithm that enables grouping of sensors lying within a distance corresponding to an n×n block of pixels, where n denotes a system parameter (e.g., 5×5). Various groups of external sensors 118 are reviewed by clustering module 316 using the pixel-based clustering algorithm to determine whether distances between groups of external sensors 118 tallies with a distance of an n×n block of pixels. If so, the groups of external sensors 118 can be associated with one another to form new groups of external sensors 118.

At 610, one or more data trees are formed from the groups of sensors including newly combined groups. The data trees are created by the clustering module 316 and stored in database.

Figure 7A:
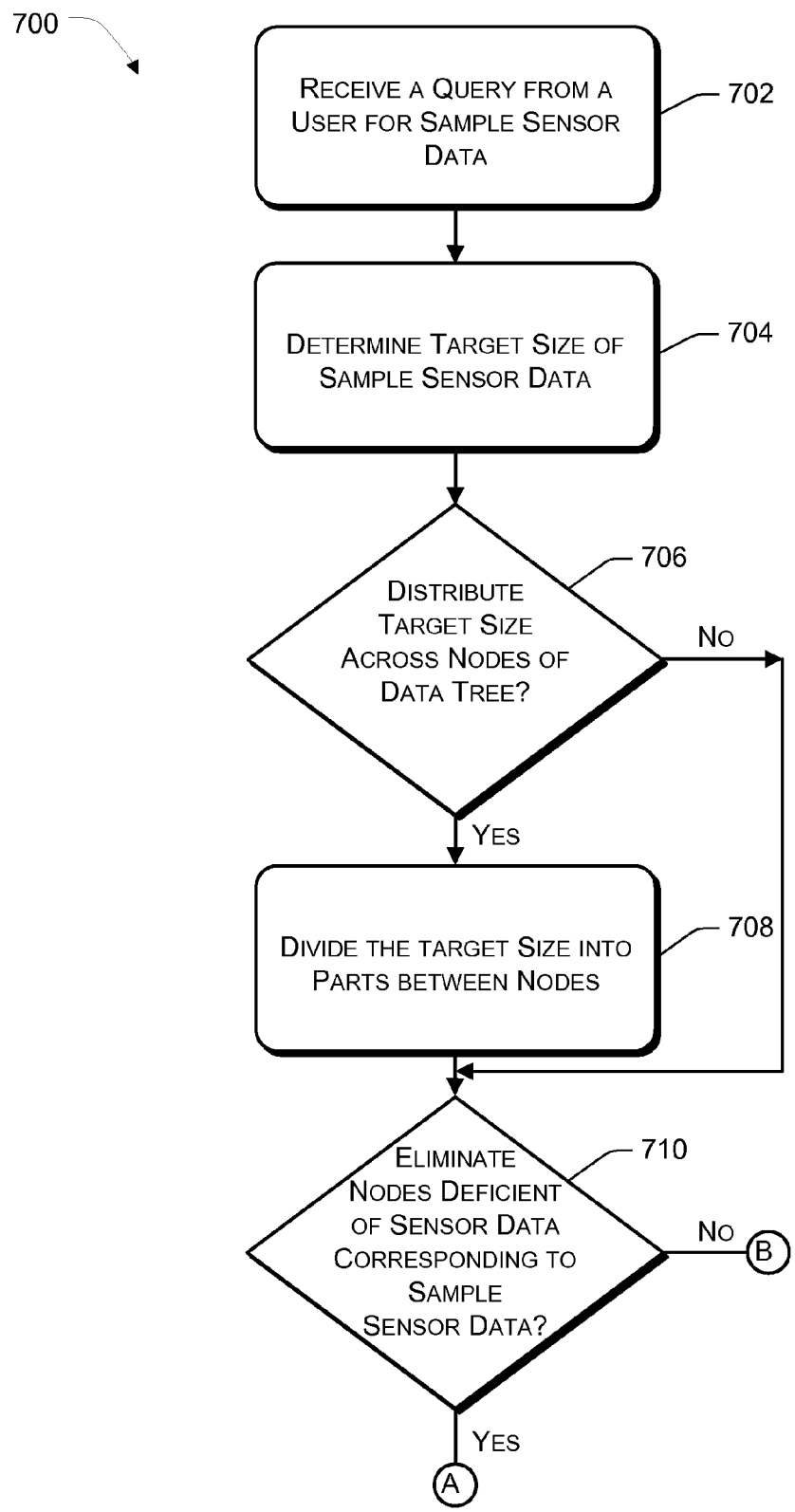
FIGS. 7A and 7B present a flow diagram of an exemplary process for processing a query for sample sensor data and identifying a subset of nodes corresponding to sample sensor data.
Figure 7B:
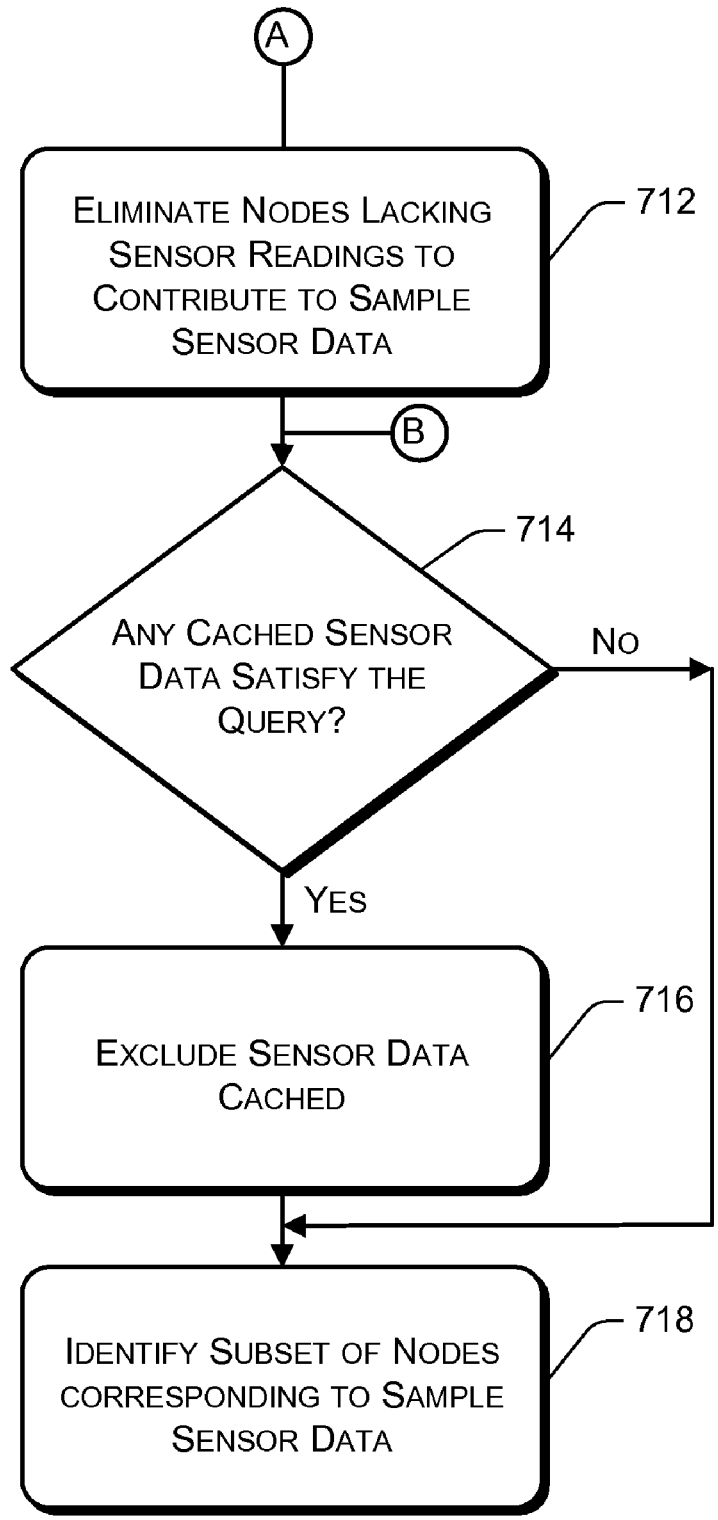

FIGS. 7A and 7B illustrate an exemplary process 700 for processing a query for sample sensor data. At 702, a query for sample sensor data is received from a user. The query may be received by the query processing module 120, which identifies a set of constraints specified by the user. The constraints may include a number of external sensors 118 that to be probed to obtain sensor readings corresponding to the sample sensor data.

At 704, a target size of how many external sensors should be probed to retrieve the desired sensor data is determined. The target size may be specified in the input query, or it may be a parameter specified by the system administrator. It may also be inferred or calculated based on information provided in the query.

At 706, a determination is made whether the target size needs to be distributed among a group of multiple nodes of the data tree. If so (i.e., the "yes" path from block 706), the target size if divided into parts and nodes from a top to bottom layer are assigned a smaller target size at 708.

If the query does not include any information regarding dividing target size (i.e., the "no" path from block 706), a determination is made whether nodes deficient of sensor data corresponding to the requested sensor data should be eliminated. The query processing module may review the query to identify whether the user has specified to eliminate such nodes. If specified (i.e., the "yes" path from block 710), such nodes are eliminated from the group of nodes of the data tree at 712.

If the query does not specify the elimination such nodes (i.e., the "no" path from block 710), a determination is made whether any cached sensor data would satisfy the query at 714. If such cached data exists (i.e., the "yes" path from block 714), such nodes can be excluded from the group of nodes in the data tree which will be probed at 716. Conversely, if the query does not specify elimination of such nodes (i.e., the "no" path from block 714), the subset of nodes from which to provide the sensor data are identified and the corresponding sensors are probed at 718. The data may then be returned to the user, such as via the UI 116.

FIG. 8 illustrates an exemplary process 800 for creating a data tree including nodes associated with sensors arranged based on a spatial distribution of the sensors and temporal distribution of sensor data. At 802, sensors to be included in an index are identified. This may be accomplished through a registration process, for example, where sensor network administrators register sensors with the web portal. The administrators may submit metadata on the sensors including sensor type, location, expiry time of sensor readings, schemas, and so on.

At 804, the identified sensors are grouped to form multiple groups of sensors based on one or more criteria, such as sensor type, expiry time, location, and so forth. As shown in FIG. 4A, for example, the clustering module 316 uses a clustering algorithm to create a bottom layer (i.e., layer 0) of all possible sensors to be represented by the index. The clustering process may then be repeated to form a hierarchy of successively higher layers up to top layer with a single root node. The hierarchy includes the bottom layer having leaf nodes coupled to sensors and layers (i.e. layer 1 and layer 2) on top of the bottom layer include internal nodes connected to the leaf nodes and/or other internal nodes.

At 806, the multiple layers of sensors are reviewed to identify the leaf nodes and the internal nodes.

At 808, the internal nodes in each layer are allocated with caches having multiple cache slots to store sensor readings. The cache slots are assigned various expiry times based on expiry times of the sensor readings obtained from the leaf nodes. It is noted that, in a given data tree 314, the number of cache slots in a cache of an internal node is kept constant across all layers. Further, expiry times of corresponding cache slots are also kept similar throughout the nodes in the various layers. In an exemplary implementation, each cache slot at nodes of top layers (i.e. layer 1 and layer 2 as shown in FIG. 4A) is assigned a similar expiry time period as corresponding cache slots in a preceding layer. In another implementation, cache slots at a node in a layer are assigned similar expiry time periods as corresponding cache slots of other nodes in the same layer.

At 810, the leaf nodes are allocated with caches to store sensor readings captured from sensors. The caches are assigned various expiry times based on the expiry time of sensor readings captured from the sensors.

At 812, one or more data trees are formed from the multiple groups of sensors. The data trees are created by the clustering module 316 and stored in database.

FIG. 9 illustrates an exemplary flow diagram of a process for obtaining sensor data from an index of nodes based on a user's query. At 902, an index of geographically-distributed nodes associated with sensors is constructed and stored using a method such as illustrated in FIG. 8. In one context, the sensors capture data pertaining to weather, traffic, parking, security, real-time views, and so forth. In building this index, a sensor registration process may be conducted, where sensor network administrators provide metadata including sensor locations and schemas of sensor readings. The metadata may include, for example, sensor location, type of sensor, schema for sensor readings, and so forth.

At 904, a query requesting sensor data including constraints such as a number of sensors, a specified expiry time, etc. is received. The query may further include an identity of certain external sensors 118 or indicate a physical boundary of a particular area in which the sensors exist. The query may be submitted by users via the UI 116 on the client devices 104 to the server 102. The query processing module 120 reviews the query to identify the specified expiry time denoting a threshold for expiry time of sensor data required by the user and other constraints, such as location of sensors, number of sensors (i.e. external sensors), and so forth.

At 906, a set of internal nodes and/or leaf nodes from which to obtain the sensor data that would satisfy the query is identified by traversing through the index. In one implementation, the set of internal nodes and/or leaf nodes is identified based on the physical boundary. Cache slots and caches contributing to the sensor data are identified by comparing the expiry time period of cache slots of the set of internal nodes and/or expiry time of cache of leaf nodes with the specified expiry time.

At 908, the sensor data possessing an expiry time greater than the specified expiry time is obtained from the identified cache slots and/or caches of the set of internal nodes and/or leaf nodes. The sensor data may be computed by an aggregation of sensor readings stored in the set of internal nodes and/or leaf nodes.

At 910, the sensor data is formatted and presented to the user in response to the user query. The sensor data may be displayed through the UI 116, as shown in FIG. 2.

Conclusion

Although embodiments of techniques of identifying and displaying a sample sensor data based on a user's query have been described in language specific to structural features and/or methods, it is to be understood that the subject of the appended claims is not necessarily limited to the specific features or methods described. Rather, the specific features and methods are disclosed as exemplary implementations techniques of identifying and displaying a sample sensor data based on a user's query.

What is claimed is:

1. A computer-implemented method comprising:
under control of one or more computing systems comprising one or more processors,
constructing an index of a plurality of nodes associated with sensors, the plurality of nodes being arranged in a hierarchy of layers of a tree structure, the plurality of nodes including leaf nodes and internal nodes, a cache associated with each of the internal nodes having a fixed number of cache slots;
assigning an expiry time period to each of the cache slots of the cache associated with each of the internal nodes such that expiry time periods assigned to corresponding cache slots of the internal nodes in each layer of the tree structure are substantially the same;
storing sensor data in each of the cache slots of the cache included in each of the internal nodes based upon whether an expiry time associated with each set of the sensor data captured by the sensors falls within the expiry time period assigned to each of the cache slots of the cache associated with each of the internal nodes;
receiving a query requesting query sensor data corresponding to a selected spatial region, the query including a specified expiry time for the requested query sensor data;
traversing through the index to identify nodes associated with one or more sensors of the sensors, the one or more sensors being in the selected spatial region; and
obtaining the requested query sensor data by identifying one or more cache slots, each of the one or more cache slots having the assigned expiry time period greater than the specified expiry time.

2. The computer-implemented method as recited in claim 1, wherein the leaf nodes cache the sensor data captured from associated sensors and the internal nodes aggregate the sensor data of the leaf nodes dependent therefrom.

3. The computer-implemented method as recited in claim 1, further comprising updating one or more cache slots of an internal node of the internal nodes with updated sensor data when the corresponding cache slots of internal nodes dependent therefrom receive fresh sensor data, wherein the updated sensor data is obtained by aggregating the sensor data in the corresponding cache slots of the internal nodes dependent therefrom.

4. The computer-implemented method as recited in claim 1, wherein the obtaining comprises identifying one or more leaf nodes including sensor data having expiry time periods at least equal to the specified expiry time period.

5. The computer-implemented method as recited in claim 1, further comprising presenting a representation of the requested sensor data in a user interface in response to the query.

6. The computer-implemented method as recited in claim 1, further comprising calculating a value based at least on:
(i) an average value from sensor data from the set of sensors in the selected spatial region having the expiry time greater than the specified expiry time;
(ii) a maximum value from sensor data from the set of sensors in the selected spatial region having the expiry time greater than the specified expiry time;
(iii) a minimum value from sensor data from the set of sensors in the selected spatial region having the expiry time greater than the specified expiry time; or
(iv) a sum value from sensor data from the set of sensors in the selected spatial region having the expiry time greater than the specified expiry time.

7. The computer-implemented method as recited in claim 1, wherein the obtaining comprises:
aggregating the sensor data having different expiry times from the identified one or more cache slots.

8. A computing device comprising:
one or more processors; and
memory to store computer-program instructions executable by the one or more processors, the instructions to store:
a database to store an index structure that includes nodes associated with the sensors, the nodes having cache slots for storing sensor data having different expiry times, the sensor data being obtained from the sensors, wherein:
the index structure comprises a tree structure with a plurality of nodes arranged in plural layers, the plurality of nodes including leaf nodes that cache sensor data having different expiry times captured from associated sensors and internal nodes that include cache slots to store aggregated sensor data having different expiry times, each of the cache slots being associated with an expiry time period,
sensor data having an expiry time is inserted into one of the cache slots of an internal node based on whether the expiry time of sensor data falls within the expiry time period associated with the one of the cache slots, and
the aggregated sensor data stored in the cache slots of the internal nodes is obtained by aggregating sensor data having different expiry times that are inserted in the cache slots of the internal nodes, each of the different expiry times falling within the expiry time period of the one of the cache slots; and
a web portal configured to:
collect metadata of sensors and index the metadata into the index structure based on a spatial distribution of the sensors,
receive a query for specified sensor data expiring after a predefined time, and
identify, using the index structure, a set of nodes from which to collect the specified sensor data expiring after the predefined time.

9. The computing device of claim 8, wherein the web portal comprises:
an indexing module to create the index structure as the tree structure with the nodes arranged in plural layers in a hierarchical manner, the nodes having the cache slots for storing sensor data having different expiry times;
a maintenance module to maintain the sensor data stored in the cache slots;
a query processing module to determine, based on the query, the set of internal nodes from which to obtain the specified sensor data; and a data acquisition module to collect the sensor data from the set of nodes.

10. The computing device of claim 9, wherein the maintenance module is configured to check a size of a cache of a leaf node upon receipt of new sensor data at the cache and eliminate previously stored sensor data that are least frequently accessed.

11. The computing device of claim 9, wherein the index structure further comprises tables associated with the layers in the tree structure, the tables providing associations between nodes in different layers.

12. The computing device of claim 11, wherein the maintenance module is configured to update the tables associated with the layers in the tree structure with updated sensor data when fresh sensor data is received at a leaf node.

13. The computing device of claim 8, further comprising:
a value determined from the specified sensor data expiring after the predefined time based at least on:
(i) an average value of the specified sensor data expiring after the predefined time,
(ii) a maximum value of the specified sensor data expiring after the predefined time;
(iii) a minimum value of the specified sensor data expiring after the predefined time; or
(iv) a sum of the specified sensor data expiring after the predefined time.

14. A system memory comprising computer executable instructions that, when executed, perform acts comprising:
generating an index structure comprising a plurality of nodes arranged in a hierarchy of layers, the plurality of nodes having leaf nodes and internal nodes, the leaf nodes including caches for storing leaf sensor data obtained from associated sensors and the internal nodes including caches with multiple cache slots having expiry time periods for storing internal sensor data having different expiry times, the storing being based on whether the different expiry times of sensor data fall within each of the expiry time periods that the multiple cache slots have, wherein the expiry time periods of the multiple cache slots of the caches of the internal nodes are synchronized across different layers in the index structure;
receiving a query for sensor data expiring after a specified time;
using the index structure to identify a set of internal nodes from which to collect the sensor data expiring after the specified time; and
acquiring the sensor data expiring after the specified time.

15. The system memory as recited in claim 14, wherein the index structure further comprises tables associated with the layers in the index structure, the tables providing associations between the plurality of nodes in different layers.

16. The system memory as recited in claim 15, further comprising revising the tables by inserting new leaf sensor data and updating corresponding internal sensor data.

17. The system memory as recited in claim 14, wherein the generating further comprises designating similar expiry time periods to corresponding cache slots of the internal nodes.

18. The system memory as recited in claim 17, further comprising obtaining the internal sensor data in a cache slot of an internal node by aggregating either leaf sensor data having expiry times that fall within the expiry time period of the cache slot or internal sensor data present in one or more corresponding cache slots of internal nodes dependent therefrom.

* * * * *